United States Patent [19]

Reents

[11] Patent Number: 4,563,566

[45] Date of Patent: Jan. 7, 1986

[54] METHOD OF MANUFACTURING PARTICLES HAVING HIGH SURFACE AREAS AND A PARTICLE MADE BY THE METHOD

[75] Inventor: John A. Reents, Trenton, Mich.

[73] Assignee: Plasma Fusion, Inc., Wyandotte, Mich.

[21] Appl. No.: 477,762

[22] Filed: Mar. 22, 1983

[51] Int. Cl.⁴ .............................................. B23K 9/00
[52] U.S. Cl. .................. 219/121 PB; 219/121 PA; 219/121 PL; 219/121 PY; 427/34
[58] Field of Search ...... 219/121 P, 121 PR, 121 PL, 219/121 PP, 121 PK, 121 PY, 121 PA, 121 PB; 427/34, 423; 204/195 S

[56] References Cited

U.S. PATENT DOCUMENTS

| | | | |
|---|---|---|---|
| 3,373,119 | 3/1968 | Krystyniak | 252/517 |
| 3,645,894 | 2/1972 | Krystyniak | 252/1 |
| 3,962,486 | 6/1976 | Gerek et al. | 427/34 |
| 4,105,437 | 8/1978 | Liu | 219/121 PA |
| 4,265,930 | 5/1981 | Shinohara et al. | 427/34 |
| 4,338,509 | 7/1982 | Bartuska et al. | 219/121 PR |

*Primary Examiner*—C. L. Albritton
*Assistant Examiner*—Marvin M. Lateef
*Attorney, Agent, or Firm*—Jeffers, Irish & Hoffman

[57] ABSTRACT

A method of manufacturing porous, irregularly-shaped particles having high surface areas and a particle made thereby is disclosed wherein small grains of a material are adhered together to form larger particles of porous, irregularly shaped form having high surface areas. Thereafter, the larger particles are injected into the effluent of a liquid stabilized plasma gun device to fuse together the individual grains forming each larger particle, thereby increasing the adherence of the individual grains, while maintaining the porous, irregularly-shaped properties thereof.

18 Claims, 4 Drawing Figures

METHOD OF MANUFACTURING PARTICLES HAVING HIGH SURFACE AREAS AND A PARTICLE MADE BY THE METHOD

BACKGROUND OF THE INVENTION

This invention pertains to a method for manufacturing porous, irregularly-shaped particles having high surface areas by utilization of a liquid stabilized plasma gun device.

There exists in some industries a requirement that a material to be used in a particular process or apparatus be available in particle form having a high surface area and of a size that gives the material a substantially free-flowing property. For example, in those industries that utilize catalysts to speed reactions, it is desirable that the catalyst have as large a surface area as possible since the accelerating effect of the catalyst on the reaction is generally directly proportional to the surface area thereof.

As used herein, the term catalyst is defined as a substance or species which is not consumed in a reaction, but whose presence provides an alternate, low-activation-energy mechanism for the reaction. Typical examples of catalysts are platinum, palladium, and nickel.

A disadvantage with some processes or apparatuses used in producing particles is their inefficiency in manufacturing particles having requisite surface areas and sizes. In manufacturing desired catalytic particles, an undesirable amount of the catalytic material is lost or consumed by the process or apparatus. Consequently, an inordinate amount of catalytic material is required to manufacture a specified smaller amount of catalytic particles. This inefficiency in manufacturing naturally translates into higher production costs and a more expensive product.

SUMMARY OF THE INVENTION

The present invention overcomes the above disadvantage by providing a method for manufacturing porous particles having high surface areas which utilizes a liquid stabilized plasma gun device.

As earlier mentioned, it is highly desirable that the catalytic particles not only be porous and have high surface areas, but also that they have a substantially free-flowing property. Very fine grains of a material will not pour out of a container in a free-flowing manner, but will instead tend to cake together in clumps. This makes it extremely difficult to properly meter specified amounts required in a process or apparatus.

Initially, the invention provides for a supply of fine grains of material to be adhered together to form a plurality of larger irregularly-shaped particles having high surface areas. This may be accomplished by feeding the supply of grains to a spray drying apparatus or a fluid bed spray granulator, both of which allow the operator to control to a great extent the final shape of the desired end product, which in this case would be particles having porous, high surface areas.

After the fine grains of material have been fed through one of the above two apparatuses and the produced porous particles collected, they are thereafter uniquely treated by the method of the present invention to produce individual porous particles having high surface areas wherein the individual grains of material making up each particle are fused together so as to form a single distinct particle.

This unique fusion of the individually adhered together grains to form a single distinct larger particle is accomplished by injecting the particles into the effluent of a plasma gun device having liquid stabilization. Whereas a spray dryer or fluid bed granulator merely adheres individual grains together, the unusual feature provided by the liquid stabilized plasma gun device is the fusing together of individual grains making up each particle into a single distinct porous particle without substantially reducing the high surface area thereof.

The particle formed by the method of the present invention not only has a porous high surface area, but also has increased adherence between its grains.

Additionally, the fused particles treated by the liquid stabilized plasma gun device are also of sufficient size to have substantially free-flowing properties to improve their storage, transportation, packing and metering properties.

Furthermore, by fusing the individual grains together which make up each individual particle, the undesirable loss or consumption of catalytic material is substantially eliminated, thereby increasing the efficiency of the method and decreasing costs associated therewith.

Finally, the initial starting material of which the fine grains are made may be a catalytic material or a carrier material on which a catalytic material may be subsequently coated, for example, by chemical vapor deposition.

Briefly stated, in one embodiment of the present invention there is provided a method of manufacturing particles having high surface areas comprising the steps of providing a supply of fine grains of a material and then adhering together the fine grains into porous irregularly-shaped particles having high surface areas. Thereafter, the larger porous, irregularly-shaped particles are collected, and then injected into the effluent of a plasma gun device having liquid stabilization to fuse together the individual grains forming each porous, irregularly-shaped particle. Fusion causes the individual grains of each particle to more strongly adhere together and to maintain the porous and high surface area properties thereof.

It is therefore one of the objects of the present invention to provide a method of manufacturing porous, irregularly-shaped particles having high surface areas by utilization of a liquid stabilized plasma gun device.

BRIEF DESCRIPTION OF THE DRAWINGS

The above mentioned and other features and objects of the present invention, and the manner of attaining them, will become more apparent and the invention itself will be better understood by reference to the following description of an embodiment of the invention taken in conjunction with the accompanying drawings, wherein.

DESCRIPTION OF A PREFERRED EMBODIMENT

Figure 1:
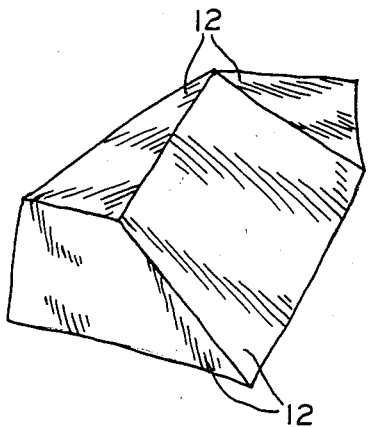
FIG. 1 is an enlarged perspective view of a fine grain.
Figure 3:
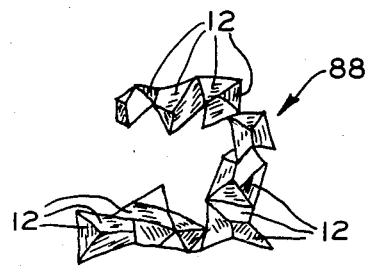
FIG. 3 is an enlarged perspective view of a porous, irregularly-shaped particle formed by the apparatus of FIG. 2.
Figure 2:
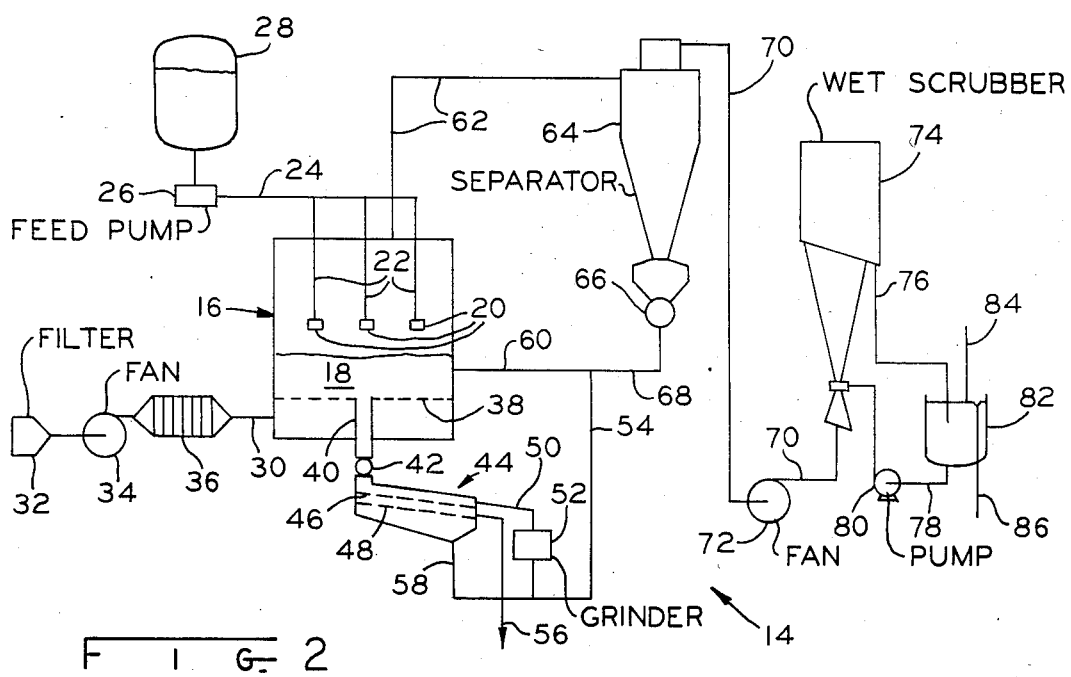
FIG. 2 is a schematic view of an apparatus for adhering a plurality of fine grains together.

Referring to the figures, fine grain 10 of a material is illustrated having a plurality of facets 12. Most of these type materials are initially obtained having a grain size which does not permit the grains to be easily metered or poured. The small sizes naturally vary, but a typical range of sizes would be 2 to 5 microns (0.002–0.005 millimeters), and when poured or metered tend to generally cake or lump together making it extremely difficult for a user to pour or meter specific amounts thereof.

To increase the fluid or free flowing properties of a fine grain material, apparatus 14 is provided to adhere together fine grains 10 into larger particles which have desirable fluid or free-flowing properties.

Although apparatus 14 may be a spray drying apparatus wherein a feed, which may be either a solution, suspension, or paste, is transformed from a fluid state into a dried particle form by spraying the feed into a hot drying medium and recovering the particles when dried, it is preferred that apparatus 14 be a fluid bed spray granulator which simultaneously dries or crystallizes the particles formed thereby. The process in the fluid bed spray granulator is carried out in a fluidized bed by spraying a liquid feed, which again may be a solution, suspension, or paste, into a fluidized layer of already dried particles. The fluidization medium is the drying air, and the fluid bed is normally kept under rigorous fluidization. Again, the specific size of the particle may be varied within certain limits, and a typical range of particle sizes available from fluid bed spray granulator 14 are 500 to 5,000 microns (0.5 to 5 millimeters).

Referring to FIG. 2, fluid bed spray granulator 14 comprises fluidized bed unit 16 containing a fluidized layer 18 of material and having nozzle atomizers 20 disposed therein. Atomizers 20 are connected by lines 22 to common line 24 which has feed pump 26 coupled thereto downstream from feed tank 28. A fluidizing gas, for example, air, is introduced into unit 16 by line 30 which has inlet air filter 32, supply fan 34, and air heater 36 coupled thereto. Perforated plate 38 is horizontally disposed in the lower portion of unit 16, and outlet 40 extends upwardly through the bottom of unit 16 and terminates near perforated plate 38. Rotary valve 42 couples outlet 40 to sieve 44, which has two screens 46 and 48 disposed therein. Line 50 communicates with sieve 44 above screen 46 to deliver these larger particles to grinder 52 to be ground into smaller particles and then delivered to line 54. Line 56 communicates with sieve 44 between screens 46 and 48 to withdraw therefrom the particles of desired size. Line 58 also communicates with sieve 44 below screens 46 and 48 to deliver fines to line 54. The smaller particles delivered from grinder 52 and fines delivered by line 58 are urged through line 54 to line 60 and into fluidizing layer 18 for further processing. Line 62 communicates with unit 16 through a top portion thereof to deliver the heated air and fines carried thereby to cyclone separator 64 where the fines are separated and delivered via rotary valve 66 to line 68 and line 60 for return to fluidized layer 18.

The air in cyclone separator 64 is then delivered through line 70 and urged by exhaust fan 72 to wet scrubber 74. Thereafter, the air is delivered by line 76, line 78, and scrubber pump 80 to scrubber tank 82. A scrubbing liquid, which may be the liquid feed, is delivered to scrubber tank 82 by line 84, and the scrubbed material is then delivered through line 86 to be drained or returned to feed tank 28.

In operation, the liquid feed is delivered from feed tank 28 to atomizers 20 to be atomized and sprayed into fluidized layer 18, which comprises dried or partially dried particles. The fluidization medium is the drying air, and the fluid layer 18 is normally kept under vigorous fluidization by the air passing upwardly through perforated plate 38. Particles are drawn through outlet 40 to be screened by sieve 44, the larger particles being ground by grinder 52 and returned to layer 18, and the finer particles or fines being delivered via line 58 and lines 54,60 back into fluidized layer 18. Particles of desired size are discharged through line 56. Further, fines collected in cyclone separator 64 are delivered by line 68 and line 60 to fluidized layer 18 for further processing.

The extent of agglomeration, which produces porous irregularly shaped particles, is dependent upon several factors, for example, the characteristics of the material, rate of solubility of particles, stickiness of wet particles, and liquid feed concentration. Further, the tendency of the particles to agglomerate will normally increase significantly when the moisture content of the fluidized particles is increased.

The velocity of the fluidizing gas, in this case heated air, should be selected to give a vigorous surface movement in order to avoid formation of lumps in the contact zones between the spray and the fluidized layer. Typical gas velocities are 1–2 meters per second for particle sizes of 1–2 millimeters.

Particle formation and growth is also influenced by the vertical position of atomizers 20 relative to fluidized layer 18. By altering the height of atomizers 20 above fluidized layer 18, different formations and growth of particles is obtainable.

Other relevant parameters in controlling the formation and growth of particles in granulator 14 are the concentration of solids in the feed, feed temperature, degree of atomization, velocity of the fluidizing gas, moisture content of the particles in the fluid bed, the degree of drying above the bed, residence time distribution in the fluidized layer, and the extent to which recycled solids are ground to a particular size.

A working embodiment of fluid bed spray granulator 14 may be purchased from Niro Atomizer, Inc., 9165 Rumsey Road, Columbia, Md., 21045, and a more detailed description thereof is disclosed in the article entitled "Production of Non-Dusty Granular Products by Fluid Bed Spray Granulation" by S. Mortensen and S. Hovmand of Niro Atomizer, Ltd., Copenhagen, Denmark, as presented at the 18th Chemical Engineering Exhibition-Congress, June 20–26, 1976, Frankfort-/Main, the contents of which are incorporated by reference herein.

Processing of fine grains 10 in fluid bed spray granulator 14 can produce porous, irregularly shaped particles 88 (FIG. 3). A particle 88 is comprised of numerous grains 10 which are individually adhered together. Particle 88 also has facets 12, the surfaces of which contain numerous holes, crevises, and the like to greatly increase the surface area thereof. Further, the size of particle 88 permits a supply of such particles to be easily poured or metered into specified amounts. This substantially free-flowing property is extremely desirable since only a specified amount of a catalyst is generally preferred for a reaction wherein the reactants exist in measured concentrations.

A supply of particles 88 is then injected into the effluent of a liquid stabilized plasma gun device to be fused and collected by a collector, for example, a water or air screen. The liquid stabilized plasma gun device may be the plasma-jet gun disclosed in U.S. Pat. No. 3,206,587, or the plasma burner apparatus disclosed in U.S. Pat. No. 4,338,509, both of which are incorborated by reference herein. Of these two devices, the plasma burner apparatus disclosed in U.S. Pat. No. 4,338,509 is preferred since it teaches an apparatus and process of radial stabilization and homogenation of a plasma effluent having a concentration of charged particles between about $2.00 \times 10^{24}$ and $0.3 \times 10^{23}$ per cubic centimeter in number and a temperature between about 15,000° K. and 60,000° K. Although preferred, it should be understood that other plasma gun devices utilizing liquid stabilization may also be used in the method of the present invention.

Figure 4:
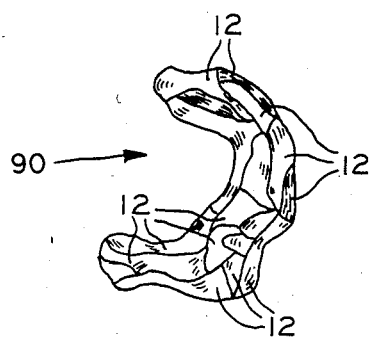
FIG. 4 is an enlarged perspective of a fused porous, irregularly-shaped particle.

Particle 90 (FIG. 4) illustrates the appearance of a particle 88 which has been fused by the liquid stabilized plasma gun device. Particle 90 is similar to particle 88 in that it is porous and has a high surface area, but differs from particle 88 in that the individual grains have been fused together by the effluent of the liquid stabilized plasma gun device to form a single distinct particle 90. This increases the adherence of grains 10, and substantially eliminates loss or consumption of the material during the process.

In manufacturing particle 90 by the method of the present invention, the material of which grains 10 are made may be a catalytic material, for example, nickel, palladium, or platinum. Alternatively, the material may be a carrier material such as a ceramic, for example, zirconium silicate $ZrSiO_4$, or corundum $Al_2O_3$. In the latter case, particle 90 made of the carrier material may have a coating of catalytic material applied thereto, for example, by chemical vapor deposition.

Although the above description referred only to a single material, quite clearly grains 10 may be made of more than one material so that particle 90 may have any desired chemical property.

While this invention has been described as having a specific embodiment, it will be understood that it is capable of further modifications. This application is, therefore, intended to cover any variations, uses, or adaptations of the invention following the general principles thereof and including such departures from the present disclosures as come within known or customary practice in the art to which the invention pertains and fall within the limits of the appended claims.

What is claimed is:

1. A method of manufacturing porous particles having high surface areas, comprising the steps of:
    providing a supply of fine grains of a material,
    adhering together the fine grains into porous, irregularly-shaped particles having high surface areas, each of the porous, irregularly-shaped particles being made up of at least two of the fine grains,
    collecting the porous, irregularly-shaped particles, and
    then fusing together the individual grains forming each porous, irregularly shaped particle by injecting the porous, irregularly-shaped particles into the effluent of a plasma gun device having liquid stabilization to strengthen the adherence of the individual grains, while substantially maintaining the porous and high surface area properties thereof.

2. The method of claim 1 wherein the material is a catalytic material.

3. The method of claim 2 wherein the catalytic material is an element selected from the group consisting of nickel, palladium and platinum.

4. The method of claim 1 wherein the plasma gun device having liquid stabilization is of the type wherein the liquid is water.

5. The method of claim 4 wherein the plasma gun device generates a plasma effluent with a concentration of charged particles between about $2.00 \times 10^{24}$ and $0.3 \times 10^{23}$ per cubic centimeter in number and with a temperature between about 15,000° K. and 60,000° K.

6. The method of claim 1 further comprising the steps of:
    collecting the fused particles, and
    thereafter coating the fused particles with a catalytic material.

7. The method of claim 6 wherein the fine grained material is selected from the group consisting of corundum $Al_2O_3$ and zirconium silicate $ZrSiO_4$.

8. The method of claim 6 wherein the catalytic material is an element selected from the group consisting of nickel, palladium, and platinum.

9. The method of claim 6 wherein the step of coating is by chemical vapor deposition.

10. A particle having a high surface area manufactured in accordance with the method of providing a supply of fine grains of a material,
    adhering together the fine grains into porous, irregularly-shaped particles having high surface areas, each of the porous, irregularly-shaped particles being made up of at least two of the fine grains,
    collecting the porous, irregularly-shaped particles, and
    then fusing together the individual grains forming each porous, irregularly shaped particle by injecting the porous, irregularly-shaped particles into the effluent of a plasma gun device having liquid stabilization to strengthen the adherence of the individual grains, while substantially maintaining the porous and high surface area properties thereof.

11. A method of manufacturing porous irregularly-shaped catalytic particles having high surface areas, comprising the steps of:
    providing a supply of material in granular form,
    adhering together grains of the material into porous, irregularly-shaped particles having high surface areas,
    collecting the porous, irregularly-shaped particles,
    then injecting the porous, irregularly-shaped particles into the effluent of a plasma gun device having liquid stabilization to fuse together the grains forming each porous, irregularly-shaped particle, thereby increasing the adherence of the grains while maintaining the porous and high surface area properties of the particles,
    collecting the fused porous, irregularly-shaped particles, and
    thereafter coating the fused porous, irregularly-shaped particles with a catalytic material.

12. The method of claim 11 wherein the plasma gun device is liquid stabilized by water.

13. The method of claim 12 wherein the granular material is selected from the group consisting of corundum $Al_2O_3$ and zirconium silicate $ZrSiO_4$.

14. The method of claim 13 wherein the catalytic material is an element selected from the group consisting of nickel, palladium and platinum.

15. The method of claim 14 wherein the step of coating is by chemical vapor deposition.

16. The method of claim 11 wherein the step of adhering is performed by a fluid bed spray granulator apparatus.

17. The method of claim 11 wherein the step of adhering is performed by a spray drying apparatus.

18. A catalytic particle manufactured in accordance with the method of providing a supply of material in granular form, adhering together grains of the material into porous, irregularly-shaped particles having high surface areas, collecting the porous, irregularly-shaped particles, then injecting the porous, irregularly-shaped particles into the effluent of a plasma gun device having liquid stabilization to fuse together the grains forming each porous, irregularly-shaped particle, thereby increasing the adherence of the grains while maintaining the porous and high surface area properties of the particles, collecting the fused porous, irregularly-shaped particles, and thereafter coating the fused porous, irregularly-shaped particles with a catalytic material.

* * * * *